US010027114B2

(12) United States Patent
Potharaju et al.

(10) Patent No.: US 10,027,114 B2
(45) Date of Patent: Jul. 17, 2018

(54) MASTER SLAVE ARCHITECTURE FOR DISTRIBUTED DC TO AC POWER CONVERSION

(71) Applicant: MPOWERSOLAR INC., Union City, CA (US)

(72) Inventors: Suryanarayana Potharaju, San Jose, CA (US); Vijay Shankar Jayaraman, San Jose, CA (US)

(73) Assignee: MPOWERSOLAR INC., Union City, CA (US)

( * ) Notice: Subject to any disclaimer, the term of this patent is extended or adjusted under 35 U.S.C. 154(b) by 748 days.

(21) Appl. No.: 13/732,167

(22) Filed: Dec. 31, 2012

(65) Prior Publication Data
US 2014/0117769 A1    May 1, 2014

Related U.S. Application Data

(63) Continuation-in-part of application No. 13/660,752, filed on Oct. 25, 2012, now Pat. No. 9,270,201.

(51) Int. Cl.
*H02J 1/00* (2006.01)
*H02J 3/00* (2006.01)
(Continued)

(52) U.S. Cl.
CPC .............. *H02J 1/12* (2013.01); *H02J 1/102* (2013.01); *H02J 3/383* (2013.01); *H02M 7/49* (2013.01); *H02M 7/5387* (2013.01); *H02M 2001/007* (2013.01); *Y02E 10/563* (2013.01); *Y10T 307/707* (2015.04)

(58) Field of Classification Search
CPC ...... H02M 7/48; H02M 7/5387; H02M 7/217; H02M 7/49; H02J 3/38; H02J 3/382; H02J 1/10; H02J 1/102

USPC ........... 307/82, 80, 66, 64, 29, 18; 363/127, 363/131, 71; 136/251
See application file for complete search history.

(56) References Cited

U.S. PATENT DOCUMENTS 5,633,793 A * 5/1997 Lee ...................... H02M 7/062
                                                363/127
5,886,563 A    3/1999 Nasila
(Continued)

FOREIGN PATENT DOCUMENTS

| EP | 1956703 A1 | 8/2008 |
| WO | 2010132369 A1 | 11/2010 |
| WO | 2010144637 A1 | 12/2010 |

OTHER PUBLICATIONS

International Search Report and Written Opinion of the International Searching Authority regarding PCT/US2013/066862 dated Apr. 4, 2014; 12 pgs.
(Continued)

*Primary Examiner* — Rexford Barnie
*Assistant Examiner* — Jagdeep Dhillon
(74) *Attorney, Agent, or Firm* — Law Offices of John Stattler, PC

(57) ABSTRACT

A solar module device with the master circuit generates the timing signal to synchronize each of the synchronized half wave rectified DC waveform generated by each of the slave circuits to a grid AC signal or a reference AC signal to allow the DC-AC power conversion of a plurality of solar cell groups provided in a module in an on-grid application and an off-grid application.

15 Claims, 15 Drawing Sheets

(51) Int. Cl.
  *H02J 1/12* (2006.01)
  *H02J 1/10* (2006.01)
  *H02J 3/38* (2006.01)
  *H02M 7/49* (2007.01)
  *H02M 7/5387* (2007.01)
  *H02M 1/00* (2006.01)

(56) References Cited

U.S. PATENT DOCUMENTS

| | | | |
|---|---|---|---|
| 6,052,294 | A | 4/2000 | Jacobs et al. |
| 6,330,170 | B1 | 12/2001 | Wang et al. |
| 6,654,261 | B2 | 11/2003 | Welches et al. |
| 7,046,534 | B2 * | 5/2006 | Schmidt ............... H02M 7/48 363/132 |
| 2002/0145896 | A1 * | 10/2002 | Caruthers ............ H02M 1/084 363/72 |
| 2006/0026816 | A1 | 2/2006 | Riall et al. |
| 2006/0062034 | A1 | 3/2006 | Mazumder et al. |
| 2006/0077604 | A1 | 4/2006 | Jansen |
| 2006/0244570 | A1 | 11/2006 | Leung et al. |
| 2007/0030612 | A1 | 2/2007 | Kamath |
| 2007/0159866 | A1 | 7/2007 | Sri |
| 2008/0002444 | A1 | 1/2008 | Shekhawat et al. |
| 2009/0196072 | A1 | 8/2009 | Ye |
| 2010/0116325 | A1 * | 5/2010 | Nikoonahad ...... H01L 27/1421 136/251 |
| 2010/0157632 | A1 | 6/2010 | Batten et al. |
| 2010/0244775 | A1 * | 9/2010 | Smith ............... H02M 3/33584 320/140 |
| 2010/0295383 | A1 | 11/2010 | Cummings |
| 2011/0090726 | A1 | 4/2011 | Brotto et al. |
| 2011/0115300 | A1 | 5/2011 | Chiang et al. |
| 2011/0133557 | A1 | 6/2011 | Reilly |
| 2011/0141785 | A1 | 6/2011 | Duan et al. |
| 2011/0254373 | A1 * | 10/2011 | Johnson ............... H02M 7/483 307/77 |
| 2012/0134186 | A1 * | 5/2012 | Johnson ............... H02J 3/385 363/71 |
| 2012/0257429 | A1 | 10/2012 | Dong et al. |
| 2013/0155735 | A1 * | 6/2013 | Ilic .................... H02M 7/72 363/71 |
| 2013/0235628 | A1 * | 9/2013 | Dong ................. H02M 7/797 363/47 |
| 2013/0249293 | A1 | 9/2013 | Yang et al. |
| 2013/0285446 | A1 * | 10/2013 | Chow .................. H02J 3/32 307/18 |

OTHER PUBLICATIONS

Kjaer, Soeren Baekhoej et al., Power Inverter Topologies for Photovoltaic Module—A Review, Institute of Energy Technology, Conference Record of the 2002 IEEE Industry Application Conference, Oct. 13-18, 2002, pp. 782-788, vol. 2, Pittsburgh, Pennsylvania.

Hirokawa, Masahiko et al., Non-Dissipative Snubber for Rectifying Diodes Applied to a Front-end Power Supply, Power Conversion Conference, Apr. 2, 2002, pp. 1176-1181, vol. 3, IEEE, Piscataway, New Jersey.

Mao, Hengchun et al., Active Snubbers to Eliminate Diode Reverse Recovery and Achieve Zero-Current Turn-Off in DC-DC Converts, Telecommunications Energy Conference, Oct. 4-8, 1998, pp. 49-54, IEEE, Piscataway, New Jersey.

Hofsajer, I. W. et al., Integrated Output Filter and Diode Snubber for Switchmode Power Converters, Industry Applications Society Annual Meeting, Oct. 2-6, 1994, pp. 1240-1245, IEEE, New York, New York.

International Search Report and Written Opinion of the International Searching Authority regarding PCT/US2013/066903 dated Apr. 11, 2014; 12 pgs.

International Search Report and Written Opinion of the International Searching Authority regarding PCT/US2013/066852 dated Apr. 11, 2014; 12 pgs.

Bellini, Armando et al., A Zero-Voltage transition full bridge DC-DC converter for photovoltaic application, SPEEDAM 2010, Jun. 14, 2010, pp. 448-453, IEEE, Piscataway, New Jersey.

* cited by examiner mPowerSolar Inc - The back plane and the slave nano-inverter Legend 'A' waveform is the grid Voltage. 'B' is the 100x Current Waveform.

MASTER SLAVE ARCHITECTURE FOR DISTRIBUTED DC TO AC POWER CONVERSION

CROSS REFERENCE TO RELATED APPLICATIONS

The present invention claims priority to and is a continuation-in-part of U.S. application Ser. No. 13/660,752 filed Oct. 25, 2012. That application is herein by incorporated by reference for all purposes.

BACKGROUND OF THE DISCLOSURE

The present disclosure generally relates to integrated circuits. More particularly, the present disclosure provides a method and system for a master circuit and a slave circuit architecture configured for a solar module. Merely by way of example, the inverter device can be coupled to a backplane of a solar module, including a plurality of solar cells. Of course, there can be other variations, modifications, and alternatives.

Since the discovery of the photoelectric effect, solar inverters have been designed to convert direct current (DC) electricity produced by solar cells or panels into alternating current (AC). The circuits termed inverters originally refer to the process of constantly inverting the incoming signal from a DC source have been performing the DC to AC conversion from watts to megawatts. Since the resurgence of the PV solar panel technologies in the early 2000's, inverters have become the point of focus as they defined the cost, performance and reliability of solar installations. Clubbed with other components as part of the Balance-of-System (BOS) components the inverter plays a significant role in defining the lifetime of the installation.

As an example, the US Department of Energy has launched the SunShot™ initiative to achieve the goal of an installed cost of $1/watt (DC) for solar systems for residential, commercial and utility-scale photovoltaic (PV) solar installations. With panel costs rapidly falling, the inverter, BOS costs and installation costs have been the focus for the PV industry. In addition the lower system efficiencies (Solarpanel to grid/end point of load), hovering around 80%, have been an area of concern as they contribute to significant capital expenditure and O&M costs. Efficient power conversion topologies that would lower the cost, improve system efficiency and performance have been sought to achieve the goal of grid parity for Leveraged cost of electricity (LCOS) for PV Solar power.

SUMMARY OF INVENTION

The present disclosure generally relates to integrated circuits. More particularly, the present disclosure provides a method and system for a master circuit and slave circuit architecture configured for a solar module. Merely by way of example, the inverter device can be coupled to a backplane of a solar module, including a plurality of solar cells. Of course, there can be other variations, modifications, and alternatives.

In a specific embodiment, the present invention provides a distributed power converter for a solar module. The system has a plurality of slave circuits, each if which is coupled to a solar cell group. Each of the slave circuits has an input comprising a DC input from a solar cell group. The slave circuit has a preliminary boost circuit coupled to the input. The preliminary boost circuit is configured to boost an input voltage from the input from the solar cell group to an intermediary voltage. The slave circuit has a DC boost circuit coupled to the preliminary boost circuit and is configured to boost the intermediary voltage to an AC RMS peak voltage. The slave circuit has a rectifier circuit coupled to the DC boost circuit and configured to wave shape the DC output to a half wave rectified DC waveform and is preferably configured to reduce a diode recovery loss in the rectifier circuit.

In an example, the system has an output coupled to a DC bus structure and a master circuit. The master circuit is coupled to each of the slave circuits via the DC bus structure. The master circuit is configured to generate a timing signal to synchronize each of the slave circuits, which generate a synchronized half wave rectified DC waveform. The plurality of slave circuits output a resulting half wave rectified DC waveform having a amplitude characterized by a combination of each of the amplitudes from each of the slave circuits.

In an alternative embodiment, a solar module device with the master circuit generates the timing signal to synchronize each of the synchronized half wave rectified DC waveform generated by each of the slave circuits to a grid AC signal or a reference AC signal to allow the DC-AC power conversion of a plurality of solar cell groups provided in a module in an on-grid application and an off-grid application.

In an example, the master circuit is configured for at least one house-keeping operation to regulate a performance of each of the slave circuits in response to a changes in an external condition on the grid AC signal when configured in the on-grid mode. In an example, the master circuit is configured for at least one house-keeping operation to regulate a performance of each of the slave circuits in response to a change in an external conditions on the reference AC signal when configured in the off-grid mode. In an example, the synchronized half-wave rectified DC waveform is converted into an AC voltage and a current waveform to feed power into a utility grid for an on-grid operation or a micro-grid for an off-grid application through a selection of an AC un-folding circuit provided per a feature of a configured application. In an example, the master circuit and the un-folding circuit uses a combination of a sense circuit to monitor the grid AC signal or reference AC signal to generate a reference signal of the slave circuit to generate the synchronized half-wave rectified DC waveform to add up a power output from each cell group.

In an example, the present invention provides a method of using a distributed power converter for a solar module. The method includes generating a DC output from a solar cell group from a plurality of solar cell groups provided in a module and receiving the DC output at an input of a preliminary boost circuit coupled to the input. The method includes boosting, using the preliminary boost circuit, an input voltage from the input from the solar cell group to an intermediary voltage. The method includes boosting, using the DC boost circuit, the intermediary voltage to an AC RMS peak voltage. The method includes wave-shaping the DC output to a half wave rectified DC waveform while reducing a diode recovery loss in the rectifier circuit and generate a timing signal from a master circuit to synchronize the half wave rectified DC waveform to generate a synchronized half wave rectified DC waveform. The method includes combining the synchronized half wave rectified DC waveform with a plurality of other synchronized half wave rectified DC waveforms to output a resulting half wave rectified DC waveform having an amplitude characterized by a combination of each amplitude from each of synchronized half wave rectified DC waveforms. Further details of the present method can be found throughout the present specification and more particularly below.

Many benefits are achieved by ways of present invention. For example, the present invention uses an integrated solar inverter device, having a master/slave architecture, on a back plane coupled to a solar module. The present solar module is efficient and less costly than conventional solar modules with external inverters connected through a junction box. Additionally, the inverter device comprises a slave circuit and master circuit. Depending on the embodiment, one or more of the benefits can be achieved. These and other benefits will be described in more detailed throughout the present specification and particularly below.

BRIEF DESCRIPTION OF THE DRAWINGS

FIG. 4A is a simplified flow diagram of a master chip module and slave chip module operation according to an embodiment of the present invention.

FIG. 4B is a simplified flow diagram of a master chip module and slave chip module operation according to an embodiment of the present invention.

DETAILED DESCRIPTION OF SPECIFIC EMBODIMENTS OF THE DISCLOSURE

Figure 1:
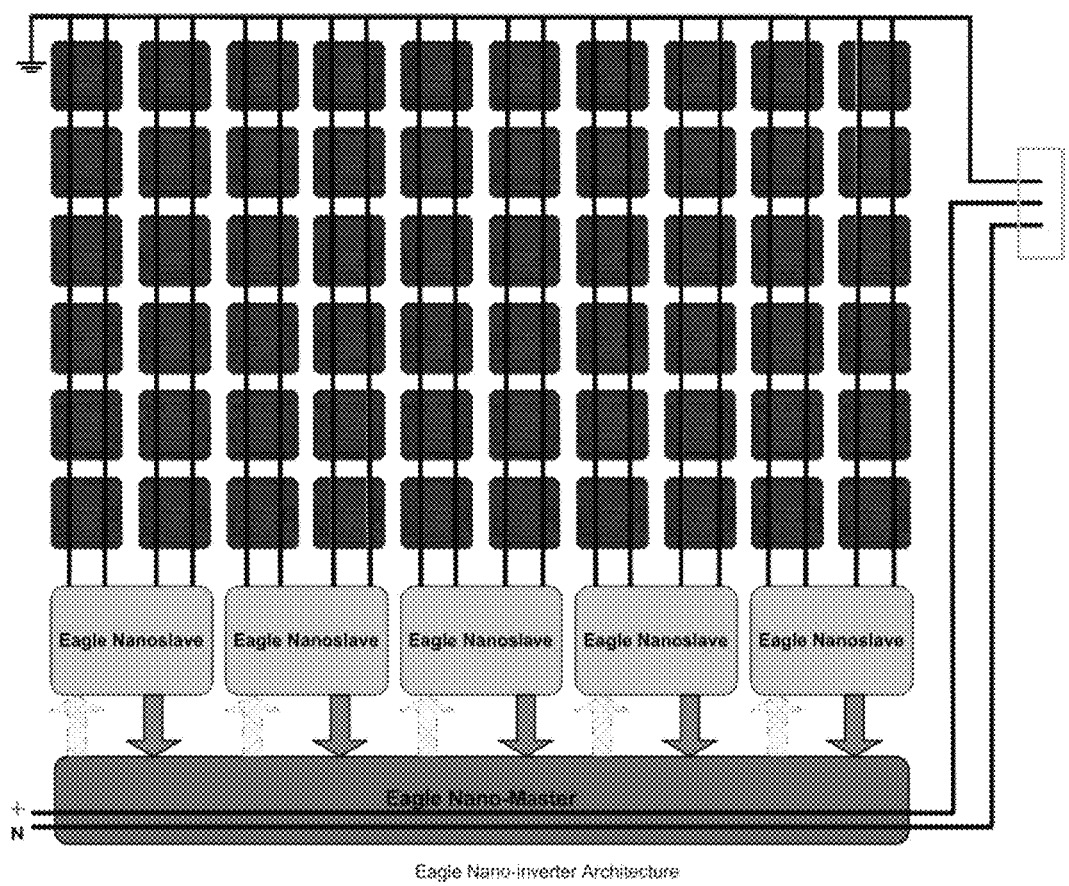
FIG. 1 is a simplified top view diagram of a solar module comprising a plurality of cells and associated inverters according to an embodiment of the present disclosure.

The present disclosure generally relates to integrated circuits. More particularly, the present disclosure provides a method and system for a master circuit and slave circuit architecture configured for a solar module. Merely by way of example, the inverter device can be coupled to a backplane of a solar module, including a plurality of solar cells. Of course, there can be other variations, modifications, and alternatives.

As PV panel increase in rated output power, the notion of running at the Maximum Power Point (MPP) has been a preliminary requirement to maximize the power generation. In addition "stringing" PV panels, which can differ in their MPP points by +/−3-5% usually results in almost all panels being run at sub-optimal power points. Further the effects of shading and soiling, which contribute to higher loss, get amplified in string topologies. As a result, central inversion and string inversion topologies have substantially lower system efficiencies. These topologies with advantages of price and reliability prove to be costly in the long run. For most financed PV projects, the higher economic cost of central inversion topologies is preferred owing to these advantages sacrificing system performance. A significant short-coming of the central inversion topologies is their inability to aid O&M through panel level monitoring and reporting. String designing, layout optimization, BOS component costs and EPC costs are significantly higher for central inversion topologies which are usually ignored while calculating the utility of such topologies Distributed converters or micro-inverters on the other hand perform the task of inversion at the panel-level enabling the system to deliver the optimal efficiency in all weather conditions. Since the output of each micro-inverter is a grid synced AC power at the desired voltage, micro-inverters are usually daisy chained to aggregate the AC current from each panel. Micro-inverters eliminate mismatch losses, suboptimal power point losses and significantly lower the effect of shading and soiling losses. In addition they bring the benefits of panel monitoring and reporting to aid O&M. Micro-inverter performance against other topologies is as shown below.

In an example, certain challenges face distributed power converters. Micro-inverter solutions have been challenged on the aspects of cost and reliability. Several first generation micro-inverter solutions have been perceived as significantly costly and unreliable. Reliability concerns severely hinder the adoption of micro-inverters in commercial and utility-scale segments where field failures would result in significant costs to repair and replace. Most micro-inverter companies however have been producing HALT/ALT and field trial data to prove their reliability. Concerns of adopting a "new technology" with significant cost impact is expected to abide within the next couple of years as more field performance data becomes available. Micro-inverters, while cost effective at the system-level, are often termed the higher cost alternative when inverter-to-inverter prices are compared.

As micro-inverters gained prominence in the PV solar market initially in the residential and small commercial (<15 KW) PV installations, the notion of developing an integrated AC panel that significantly reduces the cost while significantly lowering installation costs and remaining BOM costs is being pursued jointly by major panel manufacturers and micro-inverter companies. This approach still allows for clear distinction of liability between the panel and the micro-inverter in case of a failure. The notion of an integrated solution however suffers from major disadvantages as there are no significant cost, performance and reliability benefits. There has been a significant discussion in the industry as to what exactly constitutes an "AC Panel" and how it can achieve the $1/watt cost to normalize PV solar LCOE by the end of the decade. In addition these approaches keep the solution at the system level, slightly out of the reach of custom ASICs that can lower the cost significantly while improving reliability.

In an example, the AC panel desirably focuses on the core issues of cost and reliability while striving to improve the performance of the "AC Panel". In addition the fundamental power conversion architecture needs to provide for custom ASICs with lagging processes to significantly lower cost and much higher reliability. The Eagle-Black plane integrated inverter AC panel described in the next chapter is the next generation AC panel technology that would significantly alter the solution landscape for PV Solar installations.

In an example, the present inverter device can be integrated into the back plane of a solar panel to overcome the challenges facing the AC panel technology. The present panel is defined by a holistic approach to the AC panel solution with cost, reliability and performance being tackled simultaneously in the product design. As observed earlier cost reduction of inversion technology is only possible through custom ASIC which are generally difficult for power electronic circuits. Multi-chip modules with expensive packaging technologies are usually the chosen avenue to develop custom power circuits at lower cost. The present panel technology however relies on an innovative Master/Slave architecture to implement "nano" inversion on the DC power generated by a group of cells in the PV panels. Since the power handled by the cells is lower the present AC panel, comprises of breakthrough DC-DC boost circuit that achieves over 20×-40× voltage boosting at higher than 98% efficiency. In addition the circuit uses innovative "energy recovery circuits" to eliminate the use of expensive SiC diodes in the output bridges and replace them with inexpensive Schottky diodes. This innovative circuit also enables the entire solution to be packaged in an ASIC with lagging edge IC fabrication processes delivering superior performance at a fraction of the cost.

The present panel technology solution has a "Master" control and communication ASIC that works in tandem with up to 24 "Slave" inverter ASICs. The master/slave AC panel topology is a highly scalable solution that can be implemented in PV panels of 60 cells, 72 cells or 90 cells to deliver 120V/240V/277V AC panels. These AC panels would be independently grid-tied to enable installation all the way from a 300 W-1 MW. As each AC panel comes completely integrated with a grounded AC output, the system assembly and installation process becomes completely simple and extremely safe.

The Master/Slave topology consists of one single Master ASIC controlling the Slave ASICs, which are connected to a group of cells in the AC panel. This is achieved through the "Back Plane" which is essentially a grid array of cell connections that optimizes their placement to group the cells. Each cell group is expected to deliver at least 4-7V DC at the input of the Slave ASIC. The details of the "Back Plane" are explained in the following section.

The AC panel master/slave topology reduces the need for expensive magnetic components as well as energy storing capacitors. The Master ASIC of the AC panel to monitor the grid for the requisite voltage and frequency parameters and enables and disables the slave inverters accordingly. Cells in the panel can be separated into arrays of 10 or 12 (depending on Poly silicon/Mono crystalline/Thin film cells) into a custom designed "Back Plane" that optimizes the routing length from each group of cells to the input of their corresponding Slave inverter. As the number of cells in a group is determined by the requisite voltage input to the Slave inverter, AC panels of various output power are possible. As each Master ASIC can control up to 12 Slave inverters, AC panels ranging from 240 W-1.4 KW can be designed. The limitation on panel size would then be determined by the mechanical constraints than electrical constraints. In addition, optimal cost savings could be achieved around the 640 W systems with 277V outputs, which would enable 480V 3-phase systems.

FIG. 1 is a simplified top view diagram of a solar module comprising a plurality of cells and associated inverters according to an embodiment of the present disclosure. As shown in the Figure above, the present plane inverter architecture breaks the inversion process into DC boost with MPPT and generation of a 120V/240V/277V rectified DC waveform from each group of cells in the panel and aggregating their currents in the AC un-folder circuit controlled by the Master ASIC. The optimization of the cell placement is achieved by the custom designed "Back Plane" enables the Slave inverter to have a extremely low profile planar DC boost transformer integrated along with the ARC filter inductor. The DC boost circuit described in the following sections, achieves 20×-40× boost using a proprietary switching technique that achieves "zero voltage" switching at >200 Khz switching frequencies. The Slave inverter also senses the voltage and current of the panel group to run a cell-group level MPPT optimizing the power from each cell group. This enables the inverter powered AC panel to deliver significantly higher performance than AC panels integrated with micro-inverters. The encapsulation of all critical circuits into custom ASIC significantly improves the reliability of the AC panel, well beyond the customary 25 years. This higher reliability also comes with increased performance and substantially lower cost.

Figure 2:
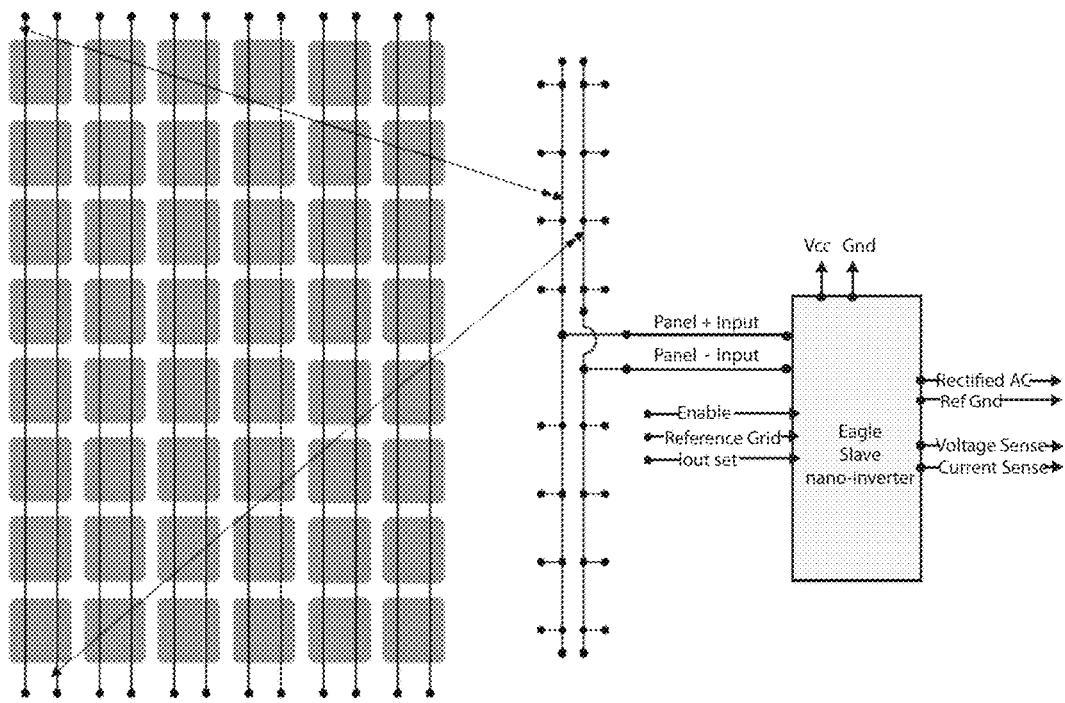
FIG. 2 is a simplified top view diagram of a module backplane coupled to a slave inverter according to an embodiment of the present disclosure.

FIG. 2 is a simplified top view diagram of a module backplane coupled to a slave inverter according to an embodiment of the present disclosure. The "Back Plane" of the AC panel is custom designed grid arrangement that groups the cells on the panel into groups driving the power circuit of a Slave inverter. The "Back Plane" (BP) in an integrated part of the electrical circuit as it plays a significant role in optimizing the cell layout.

The BP allows for minor improvements in the integration of the Master/Slave inverters by choosing the cell groups for each Slave inverter. The physical proximity of each cell group to the Slave inverter enables lower cost of tab wires while providing for "nodes" on to which the cells can be directly placed during panel assembly. The BP circuit is an addition plane layer hooked to the main inverter PCB which holds the Master/Slave ASICs. The BP shape and layout are determined by the characteristics of the cells being used for the AC panel. The number of nodes could be much smaller for a "Thin film" panel as most of the individual cells are combined in parallel, than that of a "Poly-silicon panel" where in most of the individual cells are connected in series. As a result the nodes on each individual cell branch are defined by the cell material and needs to be optimized based the desired cell output power and voltage. The aim of the BP is to ensure optimal cell grouping so that the input DC voltage from them is at least 4V. The BP also needs to ensure minimal losses on the tab wires by minimizing their lengths before reaching the input of the Slave inverters.

In a specific embodiment, the present invention provides a solar module device with a back plane integrated inverter device. The device includes a substrate member comprising a front side and a back side. The device has a plurality of solar cells, which comprising a first group of solar cells connected in a first serial configuration and a second group of solar cells connected in a second serial configuration. The device has a tab wire configuration formed overlying the front side of the substrate member. The tab wire comprises a first interconnect coupled to the first set of solar cells in the first serial configuration and a second interconnection coupled to the second set of solar cells in the second serial configuration. The device has an inverter device coupled to a back side of the substrate member. The inverter device comprises a first set of connections coupled to the first interconnection and a second set of connections coupled to the second set of connections.

Figure 3:
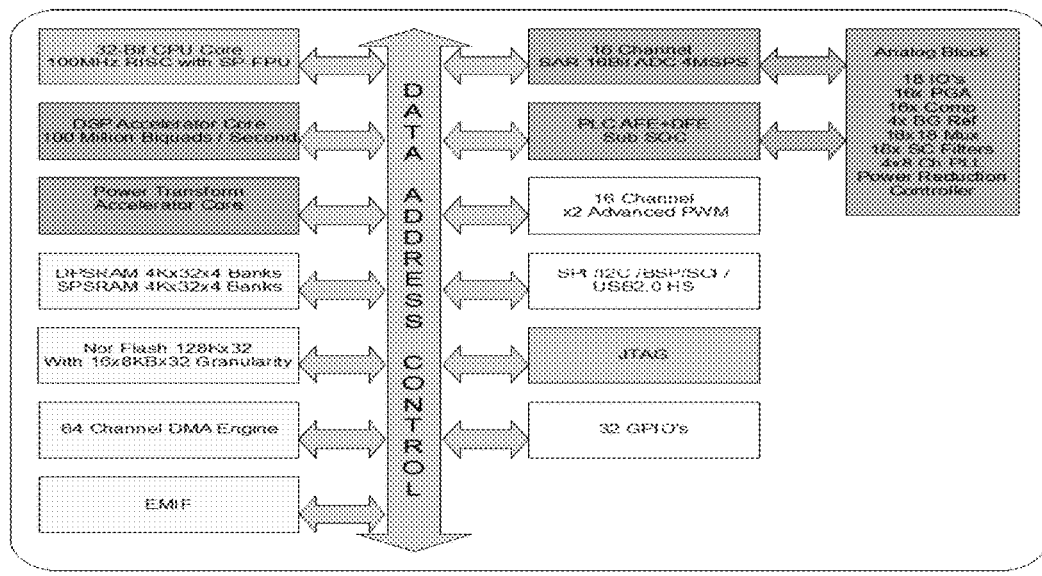
FIG. 3 is a simplified diagram of a master chip module according to an embodiment of the present disclosure.

FIG. 3 is a simplified diagram of a master chip module according to an embodiment of the present disclosure. As shown, the master chip module is a master ASIC. The Master ASIC hosts the central control part of the AC Panel. The Master ASIC has the following features.

1. Controls up to 24 Slave inverters and the integrated AC un-folder.
2. Control algorithms for both Grid-Tie and Off-grid Applications with internal sync.
3. Check for IEEE 1547/UL1741 Grid Conditions and enable/disable the power production of the Panel on an abnormal grid/load or low power condition.
4. Control the current output of each of the Inverter and enable/disable the Slave inverters in event of an abnormal grid/load condition.
5. Absolute and pre-emptive control on what is put out on the grid side/load side of the inverter.
6. Monitor the individual Inverter power production as well as cumulative power production of AC panel at the output.
7. Produce Proportional reference rectified grid Voltage for the Slave Control ASIC to produce 120/240/277V RMS Rectified Grid Waveform.
8. Synchronize the output un-folder to the incoming grid voltage or load side commutation to produce a clean sinusoidal AC waveform with minimal THD.
9. Communications on Wired/Wireless physical layers to any central data collection system.

In an example, the Master ASIC measures the Voltage and Current signals output from each of the Slave inverters and produces a proportional MPPT set point for each of them. An architectural block diagram of the Master ASIC is as shown.

The Slave ASIC is the Power Production Control ASIC of the Inverter for a given group of cells on the panel. It is receives its DC input from a serial or parallel group of cells. The Features of the Slave inverter ASIC are as follows.

1. Monitor the cell group Voltage and Current.
2. MPPT Control the cell group Current/Voltage to ensure that they operate at the MPP point.
3. Collate the Current/Voltage/Temperature Data for monitoring & reporting through the Master ASIC.
4. Produce a Rectified Sine Waveform for the output un-folder bridge at 120V/240V/277V as desired by the AC panel configuration.
5. Maintain a high quality, low harmonic distortion (THD) output rectified Sine Waveform for grid interconnection or load side commutation by the master ASIC.
6. High speed precision Mixed Signal Control loop to track the incoming reference signal from the master ASIC.
7. Work in the Average Current mode controller for Grid Tied Operation and Voltage Mode Peak Current Mode Control for Off Grid Applications.
8. A RISC Processor to have precision control state machines and data collation engines.

Figure 4:
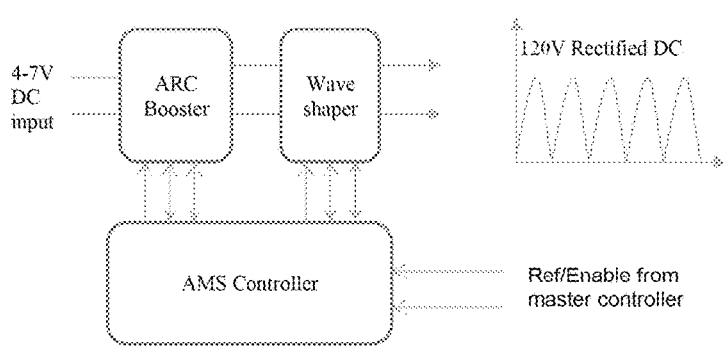
FIG. 4 is a simplified diagram of a slave chip module according to an embodiment of the present disclosure.
Figure 4:
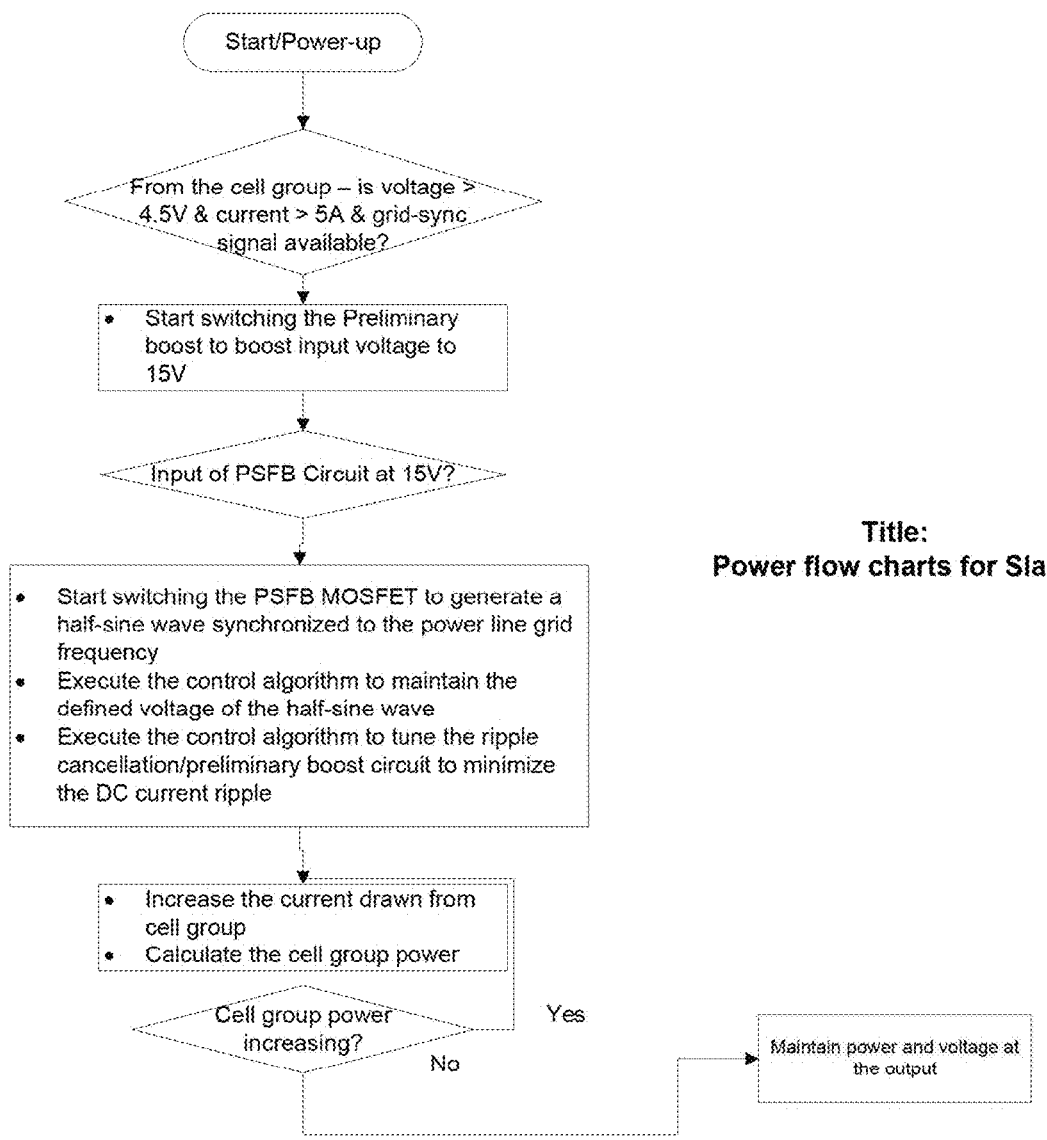
Figure 4:
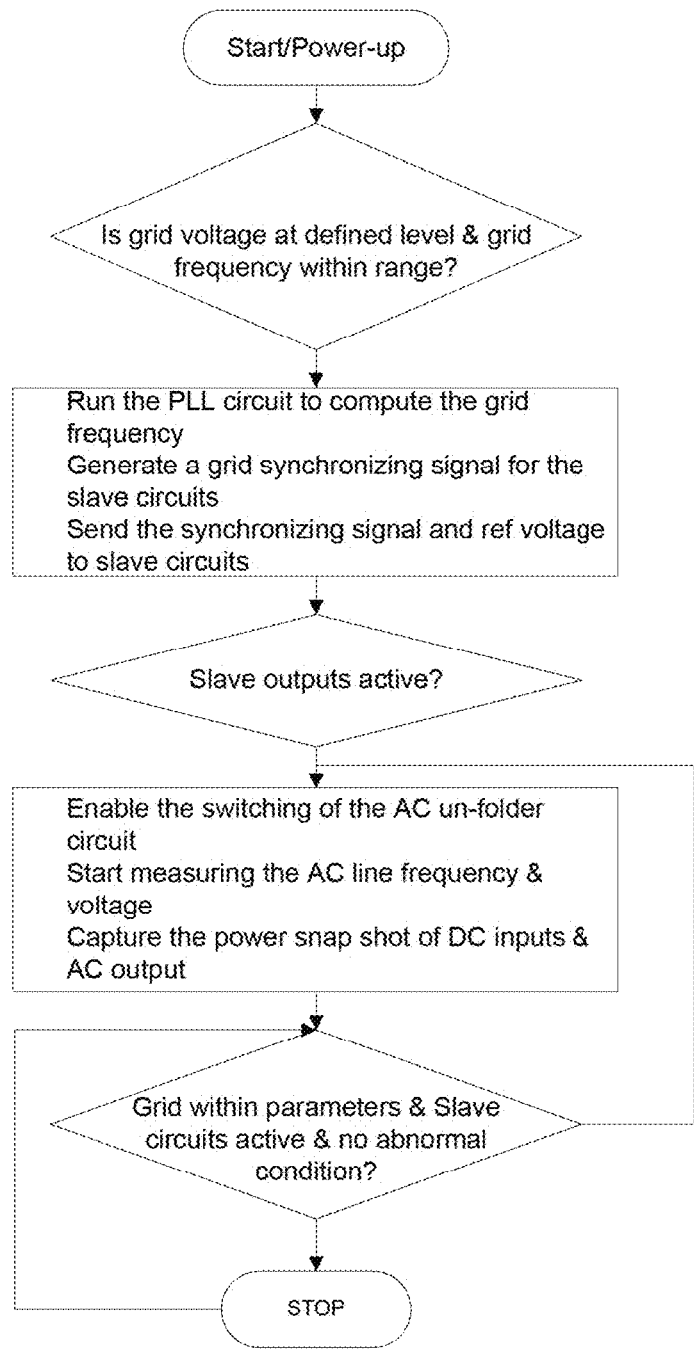

FIG. 4 is a simplified diagram of a slave chip module according to an embodiment of the present disclosure. As shown, the Block Diagram of the control ASIC is shown.

In a specific embodiment, the present invention provides a distributed power converter for a solar module. The system has a plurality of slave circuits, each if which is coupled to a solar cell group. Each of the slave circuits has an input comprising a DC input from a solar cell group. The slave circuit has a preliminary boost circuit coupled to the input. The preliminary boost circuit is configured to boost an input voltage from the input from the solar cell group to an intermediary voltage. The slave circuit has a DC boost circuit coupled to the preliminary boost circuit and is configured to boost the intermediary voltage to an AC RMS peak voltage. The slave circuit has a rectifier circuit coupled to the DC boost circuit and configured to wave shape the DC output to a half wave rectified DC waveform and is preferably configured to reduce a diode recovery loss in the rectifier circuit.

In an example, the system has an output coupled to a DC bus structure and a master circuit. The master circuit is coupled to each of the slave circuits via the DC bus structure. The master circuit is configured to generate a timing signal to synchronize each of the slave circuits, which generate a synchronized half wave rectified DC waveform. The plurality of slave circuits output a resulting half wave rectified DC waveform having an amplitude characterized by a combination of each of the amplitudes from each of the slave circuits.

In an example, each input comprises a first terminal and a second terminal. Each of the preliminary boost circuits comprises an inductive storage coupled to a capacitive storage coupled within a boost circuit. Each of the DC boost circuit comprises a phase shift full bridge boost circuit or an advanced boost circuit achieving Zero-Voltage-Switching (ZVS) or Zero-Current-Switching (ZCS) or both ZVS and ZCS. Each of the rectifier circuits comprises a four diode bridge circuit coupled with an energy recovery circuit. Each of the outputs comprises a pair of terminals coupled to the DC bus structure.

In an example, the system has various voltages. As an example, the input comprises a voltage of at least four (4) volts. In an example, the intermediary voltage ranges from about 15 volts to 20 volts. In an example, the half wave rectified DC waveform has a voltage ranging from about 160 volts to 350 volts. In an example, each of the half wave rectified DC waveforms is characterized by a substantially similar voltage to result in aggregated current waveform, which is substantially equal to a number of currents resulting from each of the half wave rectified DC waveforms. The number is equal to a number of slave circuits in the plurality of slave circuits.

In an example, each group of solar cells comprises a slave inverter circuit such that output power is optimized from the group of the solar cells configured in a serial manner and directly coupled to the slave circuit. In an example, each of the slave circuits provides a galvanic isolation between a DC source derived from each group of the solar cells and a combined AC supply which is either from a grid source or a reference AC signal generated by another device. In an example each of slave inverter circuits is suspended with a common signal and prevented from performing an DC to AC inversion to enhance safety when connected to the grid source (Anti-islanding). In an example, the distributed power converter is provided a backside of a substrate of one of the solar modules and is substantially free from a junction box or power aggregator. In an example, the master circuit is configured to unfold a voltage and a current waveform on the DC bus structure.

In an alternative embodiment, a solar module device with the master circuit generates the timing signal to synchronize each of the synchronized half wave rectified DC waveform generated by each of the slave circuits to a grid AC signal or a reference AC signal to allow the DC-AC power conversion of a plurality of solar cell groups provided in a module in an on-grid application and an off-grid application.

In an example, the master circuit is configured for at least one house-keeping operation to regulate a performance of each of the slave circuits in response to a changes in an external condition on the grid AC signal when configured in the on-grid mode. In an example, the master circuit is configured for at least one house-keeping operation to regulate a performance of each of the slave circuits in response to a change in an external conditions on the reference AC signal when configured in the off-grid mode. In an example, the synchronized half-wave rectified DC waveform is converted into a AC voltage and a current waveform to feed power into a utility grid for an on-grid operation or a micro-grid for an off-grid application through a selection of an AC un-folding circuit provided per a feature of a configured application. In an example, the master circuit and the un-folding circuit uses a combination of a sense circuit to monitor the grid AC signal or reference AC signal to generate a reference signal of the slave circuit to generate the synchronized half-wave rectified DC waveform to add up a power output from each cell group.

In an example, the present invention provides a method of using a distributed power converter for a solar module. The method includes generating a DC output from a solar cell group from a plurality of solar cell groups provided in a module and receiving the DC output at an input of a preliminary boost circuit coupled to the input. The method includes boosting, using the preliminary boost circuit, an input voltage from the input from the solar cell group to an intermediary voltage. The method includes boosting, using the DC boost circuit, the intermediary voltage to an AC RMS peak voltage. The method includes wave-shaping the DC output to a half wave rectified DC waveform while reducing a diode recovery loss in the rectifier circuit and generate a timing signal from a master circuit to synchronize the half wave rectified DC waveform to generate a synchronized half wave rectified DC waveform. The method includes combining the synchronized half wave rectified DC waveform with a plurality of other synchronized half wave rectified DC waveforms to output a resulting half wave rectified DC waveform having an amplitude characterized by a combination of each amplitude from each of synchronized half wave rectified DC waveforms. Further details of the present method can be found throughout the present specification and more particularly below.

FIG. 4A is a simplified flow diagram of a master chip module and slave chip module operation according to an embodiment of the present invention.

FIG. 4B is a simplified flow diagram of a master chip module and slave chip module operation according to an embodiment of the present invention.

Figure 5:
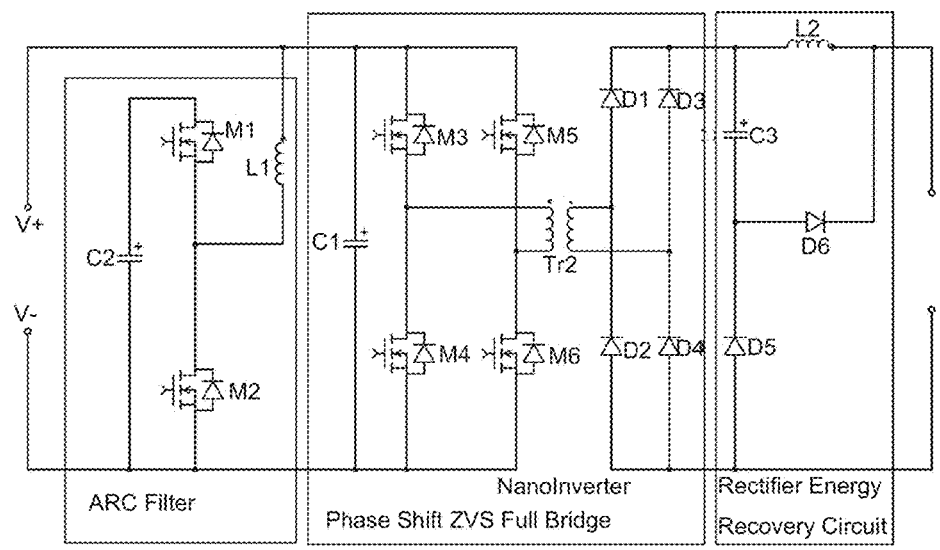
FIG. 5 is a more detailed of the slave circuit of FIG. 4, including filter, phase shifter, RERC, and boost circuit (including phase shifter and RERC) according to an embodiment of the present disclosure.

FIG. 5 is a more detailed of the slave circuit of FIG. 4, including filter, phase shifter, RERC, and boost circuit (including phase shifter and RERC) according to an embodiment of the present disclosure. As shown, the Booster Stage is the key part of the Slave inverter ASIC that enables 20×-40× voltage boost at high efficiency. In addition this Boost converter circuit is designed to use low voltage MOSFETs, which enable the encapsulation of the power circuit in a lagging edge process technology. The cost reduction is further achieved through the use of inexpensive Ultrafast Silicon PN Junction diodes in place of SiC diodes and an innovative "Rectifier Energy Recovery Circuit" minimizes the losses delivering greater than 98% efficiency. The Boost circuit consists of the 3 stages show, above which are described in detail below.

Phase Shift Full Bridge Converter

The PSFB (Phase Shift Full Bridge) Converter works with a constant dead time lagging phase leg average current mode control system. The PSFB and the RERC together use the Magnetizing inductance of the transformer along with the Primary and Secondary parasitics of the transformer to soft switch the primary side switching components (M3, M4, M5, M6) in a fashion that the ZVS operation is valid for any duty cycle. Regular designs involving the PSFB use the leakage inductance of the transformer or an additional inductor in the primary path to achieve ZVS on the primary side switching components. The main advantage of this circuit is that the Diodes D1 thru D4 which rectify the output of the transformer does not freewheel with the Inductor. Hence full Discontinuous Conduction Mode (DCM) is achieved on the rectifier Diodes.

The DCM mode of operation is crucial for the transformer to cut off at a predefined interval exposing the magnetizing inductance to the primary side components for a Zero Voltage Switching during dead times between M3, M4 and M5, M6. Zero Voltage Switching of primary side components is highly desirable as these components can be switched at a much high frequency thereby reducing the size of the transformer, inductor and capacitors needed in the circuit. The Slave inverter can effectively be built with integrated magnetic switching at >250 Khz to about 2 MHz limited with the availability of Ferrite Materials.

The unique feature of the circuit is to use the primary magnetizing inductance which is lossless to actually freewheel the primary part of the circuit to reduce the switching losses of the Converter considerably to an insignificant level and reduce the common mode conduction loss of the primary side switching components and use minimum parasitics on the switches to achieve ZVS Commutation. The energy storage in the transformer becomes very less owing to a higher inductance value used for ZVS commutation and nullifies the need for a leakage inductance thereby tightly coupling the Primary and Secondary windings of the transformer with a high coefficient of coupling. The Primary Side Switching circuit operates satisfactorily in ZVS mode for a Primary Leakage Inductance in the range of 0-10% of the Primary Magnetizing inductance of the transformer indicating that the leakage inductance has insignificant role in the commutation of the ZVS transition of the Primary Side Switching Components.

Rectifier Energy Recovery Circuit

The Rectifier Energy Recovery Circuit (RERC) is a crucial part of the PSFB Circuit to operate in the ZVS region. The RERC removes reverse recovery charge if any on the rectifier diodes (D1 thru D4) thus enabling the use of regular inexpensive Silicon PN Junction diodes against expensive high voltage SiC Schottky Diodes.

The RERC recovers the junction energy of diodes D1 thru D6 in to the capacitor C1 and then transfers the energy to the output thus making the diodes D1 thru D4 behave like a majority carrier device as a schottky diode.

The RERC also free wheels the inductor making D1 thru D4 always stay in DCM irrespective of the output Power Level. Making Diodes D1 thru D4 to stay in DCM is crucial for the Converter as this nullifies the switching losses to an insignificant value and hence the Converter can be operated at a significantly higher frequency reducing the Inductive and Capacitive components in the circuit thereby reducing the form factor and size of the circuit considerably.

ARC Filter Stage

The Active Ripple Cancellation (ARC) Filter cancels the DC Current Ripple found on the input Solar Panel Voltage. M1 and M2 switches operate on a principle of a bidirectional DC-DC Converter. The ARC Filter Charges Capacitor C2 to a stipulated voltage during low conduction states of the PSFB and will discharge the capacitor during high conduction states of the PSFB Converter.

The ARC filter operates the switches in a fully Zero Voltage Switched Operation using a Constant Dead-time Average Current Mode Control. The ARC Filter intends to replace Aluminum Electrolytic Capacitors with a high reliability Metal Film or Ceramic Capacitor of a lower capacitance Value.

The Capacitor C2 is fully utilized on the Voltage Scale between Vin and Vmax Rating of the Capacitor. The ARC Filter filters out the 120 Hz/100 Hz Line frequency ripple introduced by the PSFB minimizing the current ripple seen by the Solar Panel.

AC Un-Folder Circuit

The AC Un-Folder Circuit is critical for this implementation. The Aggregated power of each of the Nano Inverter Boost Circuit is available on the AC un-folder Input V+/V−. Since the output of the boost circuit is a rectified sine wave, the Un-folder circuit converts the incoming rectified sine wave to line frequency AC sine wave. In principle, the un-folder circuit has to prevent any rectified sine waveform from the line to enter into the Boost Circuit Output when the boost circuit is not producing any power. Though the un-folder circuit is hard switched, the switching losses are negligible due to the low switching frequency which is usually the line frequency (50/60 Hz).

Figure 6:
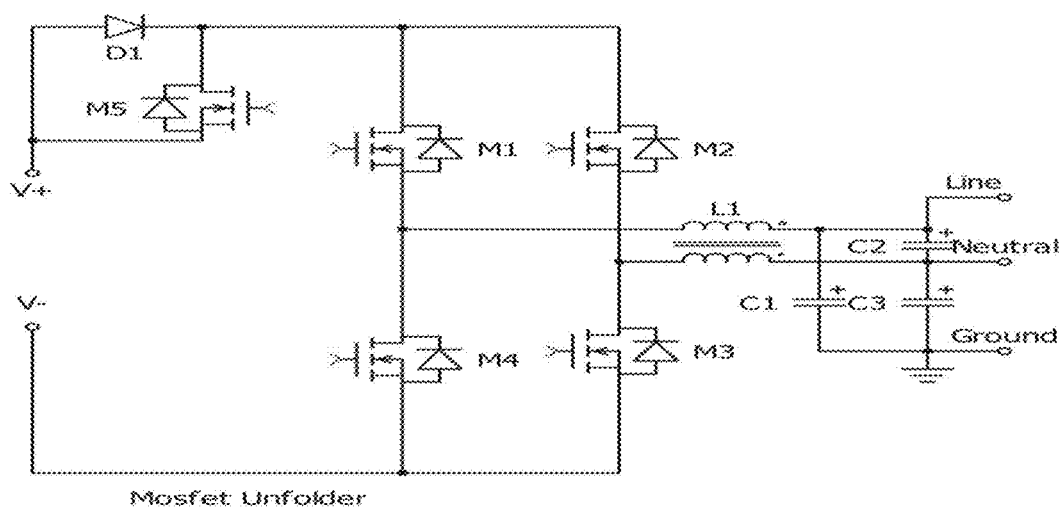
FIGS. 6, 7, and 8 are examples of inverter circuits according to an embodiment of the present disclosure.
Figure 7:
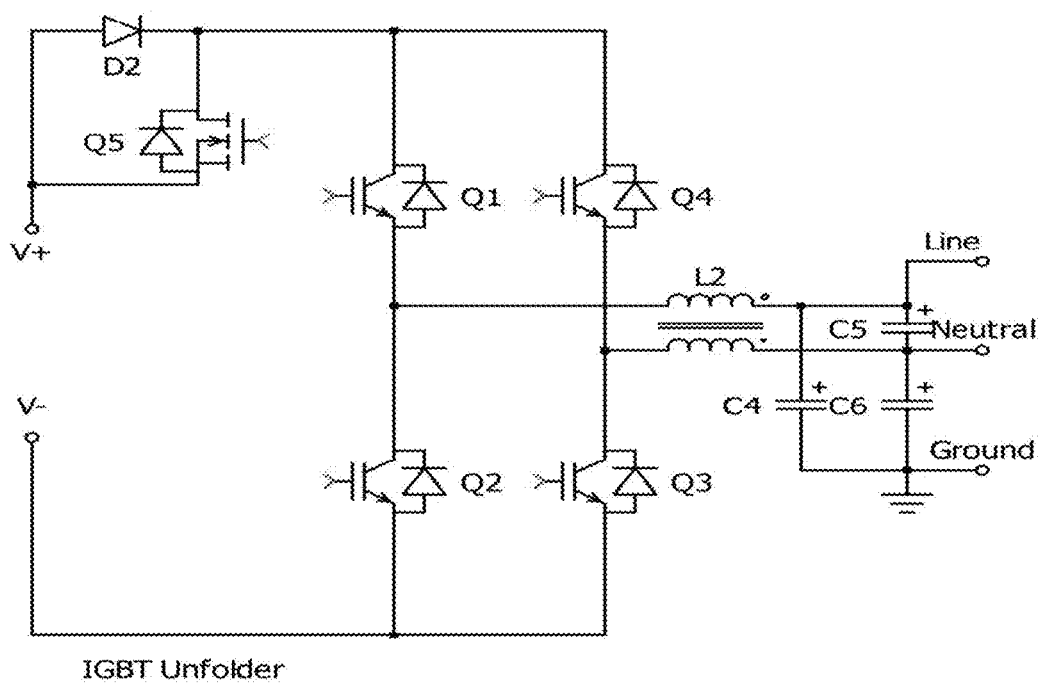
Figure 8:
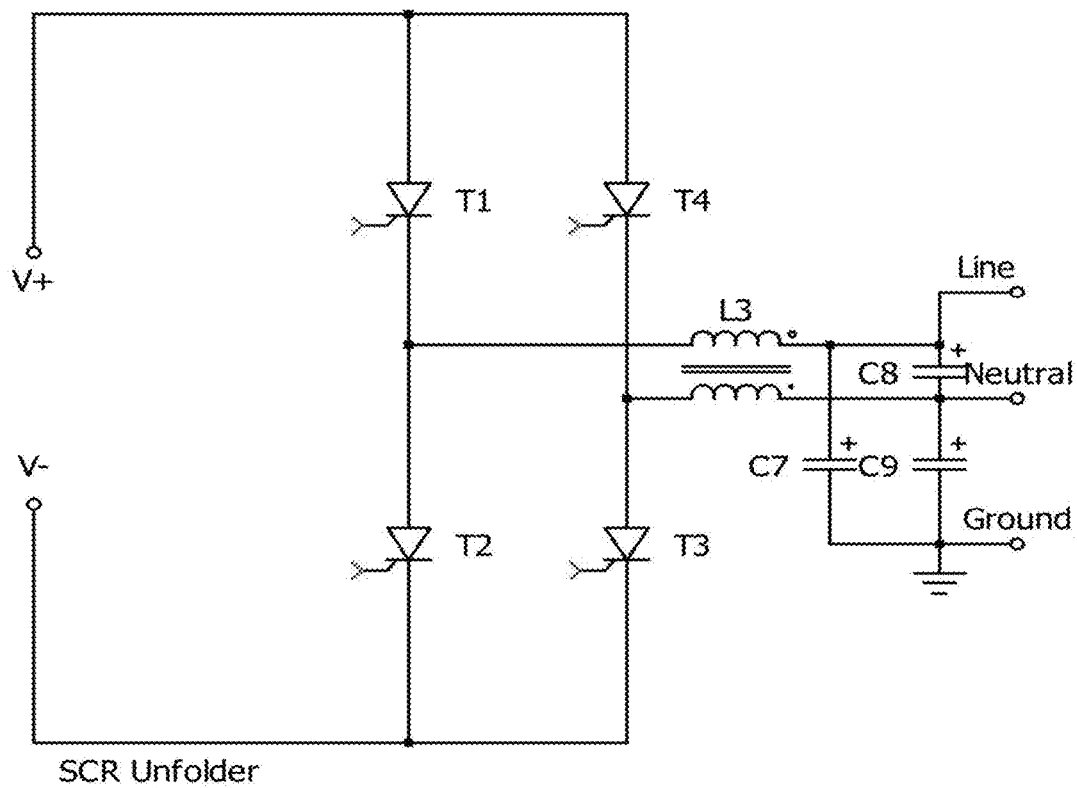

In the following sections, various schemes of implementing the AC Un-folder are specified, which are also referred to in FIGS. 6, 7, and 8.

MOSFET Un-Folder

In this Scheme, the Mosfets M1, M2, M3, M4 form the unfolding commutation circuit. When the voltage between Line and Neutral is positive, M1, M3, M5 are on and when the Line and Neutral is negative, M2, M4, M5 are on. The Line Filter comprising of L1, C1, C2, C3 filter out the switching transient effects from the Unfolding Circuit. Diode D1 forms a Reverse Blocking Diode which does not allow the body diode rectification to enter into the boost circuit output when the system is not producing any power. To reduce the losses of the Diode D1, Switch M5 is used, switch M5 is on when there is power production from the system. This Un-Folding Scheme allows for a low conduction loss implementation in voltages up to 250V Rms. The Un-Folder Dead time of this implementation can be less than a 200 ns making the Un-Folder output a very clean Sine wave of less than 2% THD. Since the output switches can be controlled, the system can be shut off at any point on the line cycle.

IGBT Un-Folder

In this scheme, the IGBT's Q1, Q2, Q3, Q4 form the unfolding commutation circuit. When the voltage between, Line and Neutral is positive, Q1, Q3, Q5 are on and when the Line and Neutral is negative, Q2, Q4, Q5 are on. The Line Filter comprising of L2, C4, C5, C6 filter out the switching transient effects from the Unfolding Circuit. Diode D1 forms a Reverse Blocking Diode which does not allow the body diode rectification to enter into the boost circuit output when the system is not producing any power. To reduce the losses of the Diode D1, switch Q5 is used, switch Q5 is on when there is power production from the system. This Un-Folding Scheme allows for a low conduction loss implementation in voltages between 400V up to 600V Rms. The Un-Folder Dead time of this implementation can be less than a 500 ns making the Un-Folder output a very clean Sine wave of less than 3% THD. The system will be rugged as the devices Q1, Q2, Q3, Q4, will have a short circuit rating for a period of 10 us. Since the output switches can be controlled, the system can be shut off at any point on the line cycle.

SCR Un-Folder

In this Scheme, the SCR's T1, T2, T3, T4 form the unfolding commutation circuit. When the voltage between, the Line and Neutral is positive, T1, T3 are on. When the Line and Neutral is negative, T2, T45 are on. The Line Filter comprising of L3, C7, C8, C9 filter out the switching transient effects from the unfolding circuit. Since SCR's are unidirectional conduction devices, the system does not require a blocking diode. This un-folding Scheme allows for a low conduction loss implementation in voltages between 100V up to 600V Rms. The un-folder dead time of this implementation can be less than a 100 us making it output a Sine wave of slightly less than 5% THD. The system will be rugged as the devices T1, T2, T3, and T4 will have a short circuit rating for a period of 10 us. Since the output switches can be controlled on and not off, the system can be shutoff only at the zero cross of the line cycle.

The key feature of the AC Panel remains the integration of the power generated from each of the Slave inverters by the Master. The integration and control aspect of the AC panel remains critical as power aggregation at small currents is quite difficult. The Master/Slave architecture of the AC panel has 2 architectural features in place to enable power aggregation with simple control algorithms.

1. Reference synced rectified DC output waveform at uniform voltage from Slave inverters
2. Synced current wave form matching the reference signal generated by Master from the Slaves For instance to generate a 120V AC at the output of the AC un-folder the Master would set the rectified DC voltages of the Slave inverters at 169V RMS.

Figure 9:
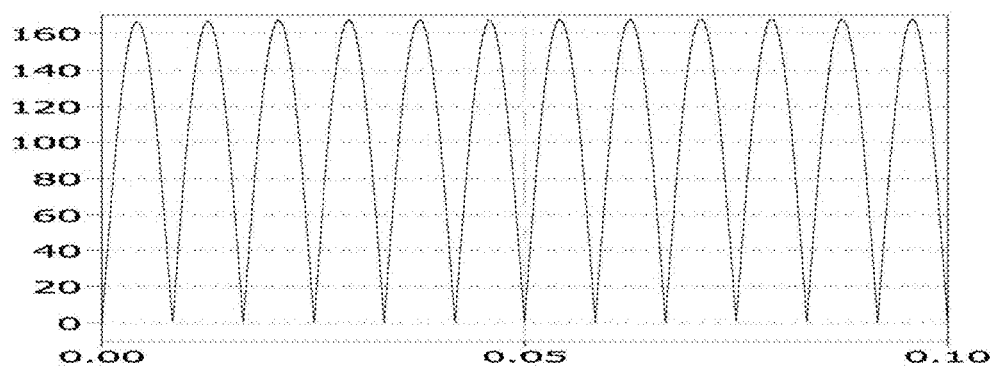
FIG. 9 is a waveform derived from a slave circuit according to an embodiment of the present disclosure.

FIG. 9 is a waveform derived from a slave circuit according to an embodiment of the present disclosure. The output voltage waveform from each of the Slave inverters for a 120V AC output is as shown.

Figure 10:
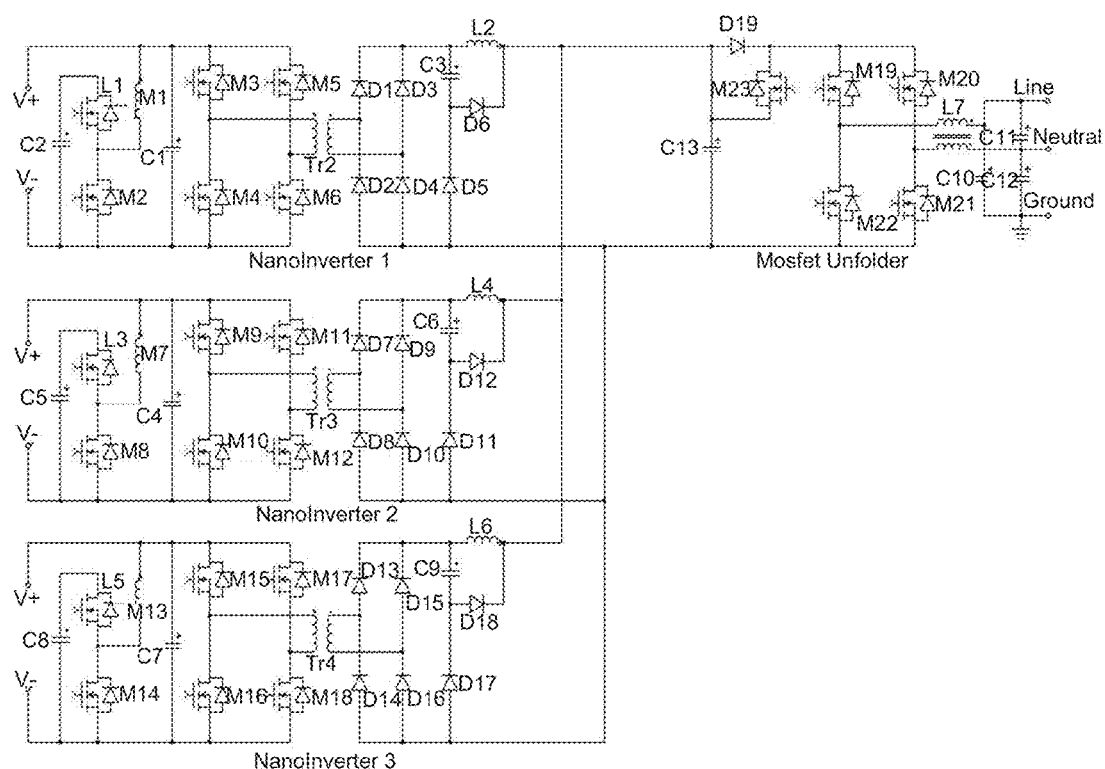
FIG. 10 is an overall diagram of a master circuit coupled to a plurality of slave circuits according to an embodiment of the present disclosure.

FIG. 10 is an overall diagram of a master circuit coupled to a plurality of slave circuits according to an embodiment of the present disclosure. In addition to the voltage set point, the reference sync signal, which would be a low voltage stepped down grid voltage of 2.5V p-p for grid-tied application and master generated 2.5Vp-p rectified sine wave for off-grid application, ensures an identical voltage waveform from each of the Slave inverters. The Slave inverters further generate a matching current waveform depending on the current set point provided by the Master corresponding to their MPP points. These reference points also help the Master enable/disable the Slave inverter in less 10 us, to comply with the anti-islanding requirements for various safety standards. In conjunction with the reference signal, voltage set point and current point a fool-proof shutoff can be implemented in the Slave inverters with relatively simple control loops. At the same time, the steady state run time performance is made flawless with these reference signals from the Master, making a the control loops for the Slave absolutely rudimentary. It is important to note that the MPP points for each of the Slave inverters is determined by the Master which has much higher compute power than the AMS controllers in the Slaves. The Master samples the current and voltage values from each of the Slave devices at the beginning of each AC cycle to determine their corresponding set points. The following figure shows the circuit of the interconnection of the Slave inverter outputs aggregated to feed the AC un-folder (MOSFET un-folder shown here). The parallel interconnection is possible due to the identical waveforms generated from each of the Slaves. The current waveform generated from each of the Slaves is also a rectified sine wave, synced up to the reference signal provided by the master. The aggregation of the current waveforms at various amplitude levels does not have any bearing on the output THD, as they are phase aligned and frequency correlated. The input of the AC un-folder with an active MOSFET circuit ensures that the aggregated rectified DC current and voltage waveforms are filtered to ensure a smooth sine wave. The AC un-folder circuit can thus be a simple commutation circuit that converts the rectified DC voltage and current waveforms into the desired AC waveform at requisite line frequency. The output line filters are designed to provide 120V/240V/277V single-phase or 240V split phase AC outputs directly from the panel. This simplifies the output AC cable design which can be any regular grounded AC connector with 15 A current rating. The following figure illustrates the independent current wave forms from the Slave inverters plotted against the reference voltage waveform. The last waveform in the figure shows the aggregated AC panel voltage and current waveform.

Figure 11:
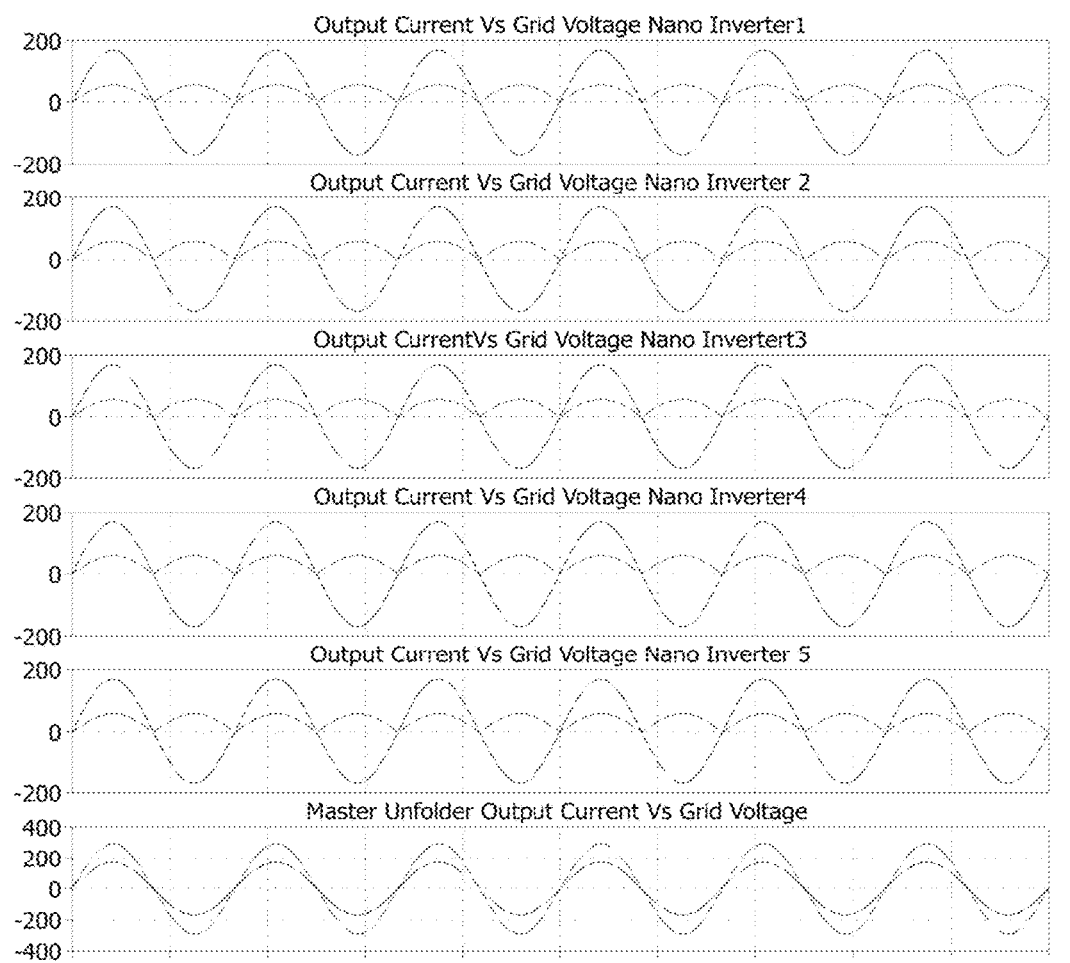
FIG. 11 illustrates each of the voltage and current wave forms from each of the slave circuits and an aggregation of each of the voltage and current wave forms according to an embodiment of the present disclosure.

FIG. 11 illustrates each of the voltage and current waveforms from each of the slave circuits and an aggregation of each of the voltage and current wave forms according to an embodiment of the present disclosure. Note: Legend: 'A' waveform is the grid Voltage. 'B' waveform is the 100× Current Waveform.

Figure 12:
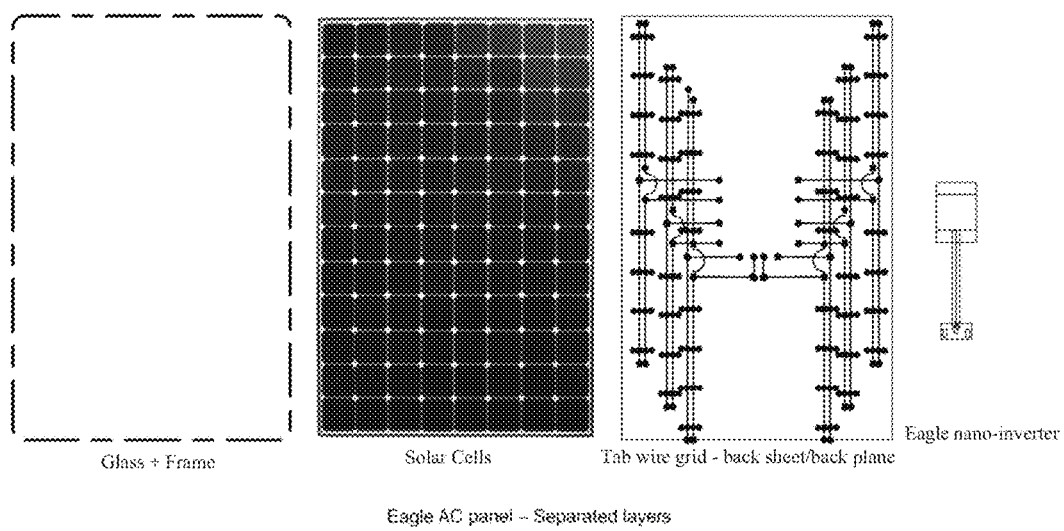
FIG. 12 illustrates solar cell elements, including a glass member, a plurality of cells, a backplane, and an inverter according to an embodiment of the present disclosure.

FIG. 12 illustrates an AC module or panel, including glass/frame, solar cells, backplane, and inverter according to an embodiment of the present invention. As shown, the AC panel overcomes challenges limiting the wide spread adoption of AC panels in solar PV installations. In each of the three significant aspects—cost, reliability and performance, the AC panel solution fares far better than current solutions. Elimination of junction box diodes saves 2-3% of power loss straightaway in this example. Each cell group performing at MPPT significantly lowers soiling losses making the solar panel can work even on partially shaded conditions providing a higher MPP performance over a regular micro-inverter/central inverter under the same conditions. Optimization or improvement of cell group performance improves the overall MPP performance by 5-10% in an example Slave inverters deliver greater than 98% efficiency with PSFB and RERC circuits. Overall efficiency higher than 97% from the panel delivering AC in this example ZVS switching delivers high efficiency even for 240V/277V systems with about 40× boosting in an example. Overall system performance surpasses the combination of DC Optimizer with Central inverter or regular micro-inverter by about 5-10% depending on conditions. Overall System Efficiency in commercial scale can be improved from 91-93% to about 96% (Limited by AC Cable Design) under field Conditions. In an example, elimination of cable costs lowers AC panel cost by about 20% in an example. Elimination of enclosure for the inverter eliminates 5% of the cost in an example. Elimination of junction box in the panel saves about $15. Elimination of DC cable connectors saves about $7 in an example. Elimination of assembly costs related to Panel and micro-inverter in an example. Combination of back panel and integrated Inverter PCB saves panel costs in an example. Encapsulation of the power circuit in a custom ASIC cuts the cost of power circuit by 60% of its discrete solution in an example. Encapsulation of the control and communication ASIC lowers the cost of the Master controller to about 50% of the current discrete solution in an example. Inverter based Master/Slave architecture lowers the cost of magnetic by 50% in an example. Inverter based Master/Slave architecture replaces Metal Film Storage of Line frequency Power with highly inert Ceramic Capacitor lowering the cost by 80% in an example. The solution nears a $0.12/watt DC installed for Inverter and BOS in an example. Elimination of the DC Ground removes the need for DC GMT which lowers the BOS Cost by 5% in an example.

In an example, opto-isolators and discrete gate drive circuits are eliminated improving MTBF. Integrated planar magnetic components improve the Mean Time Between Failure (MTBF), field repeatability and simplified production process. Encapsulation of power circuit on Slave ASIC improves reliability. Encapsulation of control and sense circuits in slave ASIC eliminates discrete components prone to degradation. Elimination of high capacity metal film capacitor with automotive grade ceramic capacitors improve the reliability and power density of the product by a major margin.

In an example, the present invention provides a method of assembling a solar module device with a back plane integrated inverter device. The method comprises providing a substrate member comprising a front side and a back side. The substrate member has a tab wire configuration (e.g., aluminum, copper material) thereon. The method includes coupling a plurality of solar cells, the plurality of solar cells comprising a first group of solar cells connected in a first serial configuration and a second group of solar cells connected in a second serial configuration such that the tab wire configuration is formed overlying the front side of the substrate member. The tab wire comprises a first interconnect coupled to the first set of solar cells in the first serial configuration and a second interconnection coupled to the second set of solar cells in the second serial configuration. The method includes coupling an inverter device to a back side of the substrate member. The inverter device comprises a first set of connections coupled to the first interconnection and a second set of connections coupled to the second set of connections. The first group of solar cells comprises a first DC slave circuit and the second group of solar cells comprising a second DC slave circuit. In an example, the solar module comprises a sandwiched structure including backplane, solar cells, tab wire, and integrated inverter in a single assembly. The substrate is made of glass, epoxy resin, or other electrically insulating material in an example.

Figure 13:
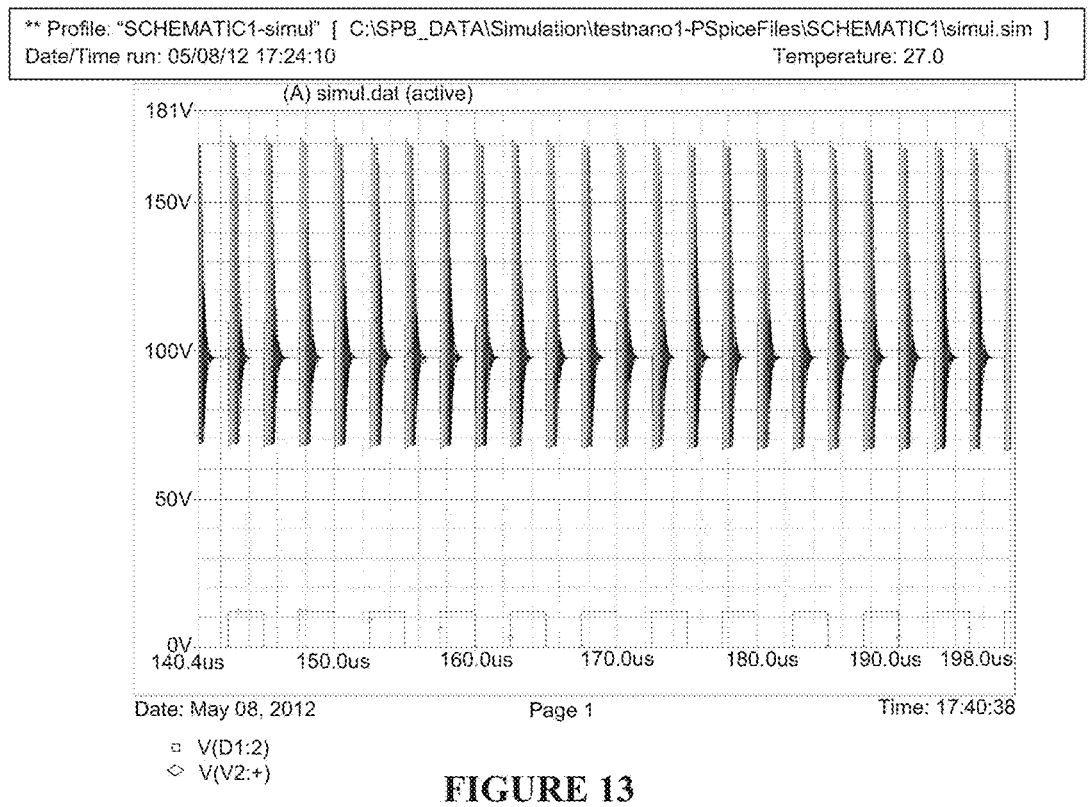
FIGS. 13 and 14 illustrate waveforms with switching voltages across rectifier bridge diodes with and without the RERC circuitry according to an embodiment of the present disclosure.
Figure 14:
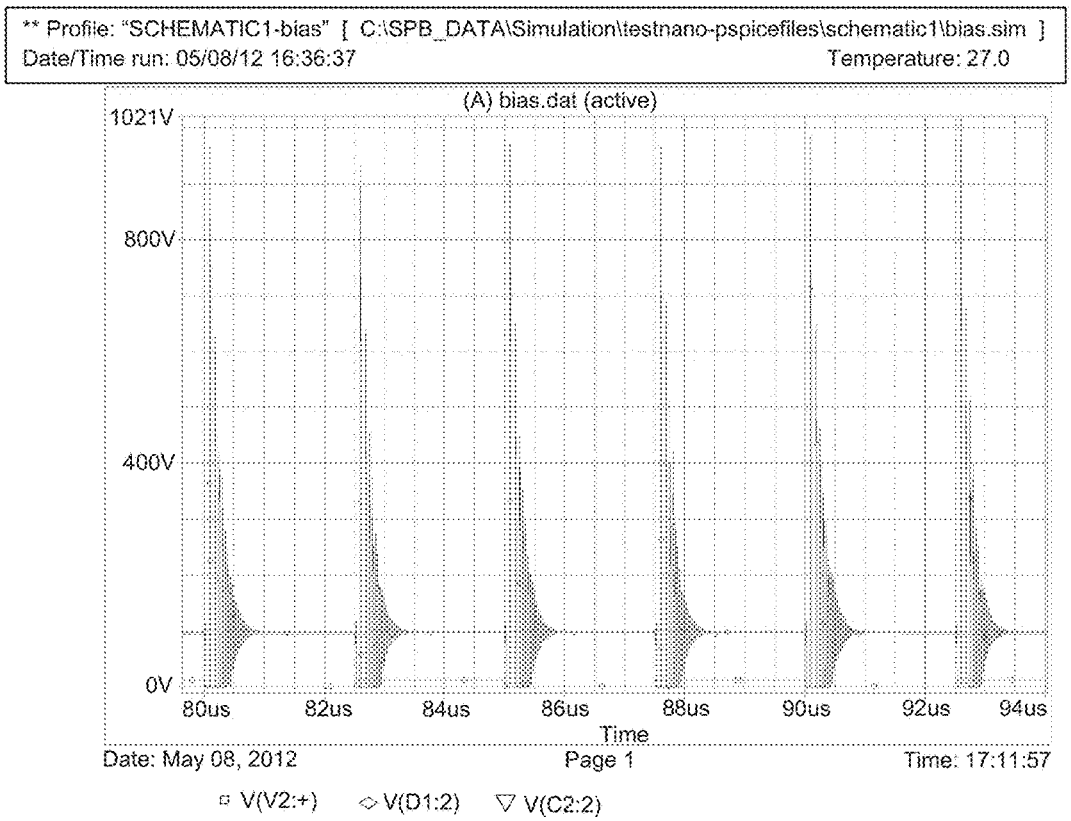
Figure 15:
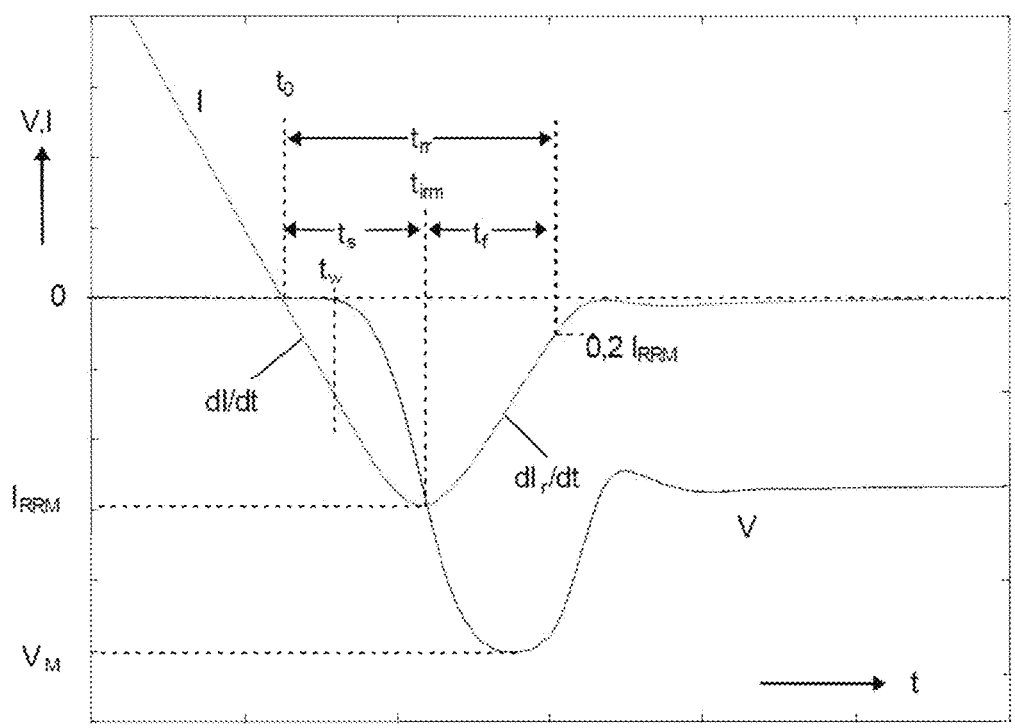
FIG. 15 illustrates a voltage/current plotted against time for the circuitry of FIGS. 13 and 14.

Referring now to FIGS. 13, 14, and 15, as shown are waveforms from a full-bridge rectifier circuit at the secondary of the transformer that converts 1666 digital sine wave samples into absolute (only positive pulses) pulses. As a result the diodes switch 1666 time during each sine wave cycle. Part of the energy transferred across the transformer by the PSFB is lost every time a diode in the rectifier bridge switches. The common diode power loss is due to the reverse recovery charge present on the diode at the time of switching. The reverse recovery energy loss (FIG. 15) is given by Vm*Irrm*trr/2. Refer to the image for the actual loss. As the switching times are high this loss is pretty significant. The Rectifier Energy Recovery Circuit, actually adds additional passive elements to snub these losses. An additional capacitor C3 in the snubber circuit is charged during the reverse recovery period and recycled into the output during the time the diode actually conducts. Over a period of 1666 switching cycles 3-4% of power loss could be saved through the RERC circuit. Waveforms with the switching voltages across the rectifier bridge diodes with and without the RERC circuitry are provided by FIGS. 13 and 14)

Figure 16:
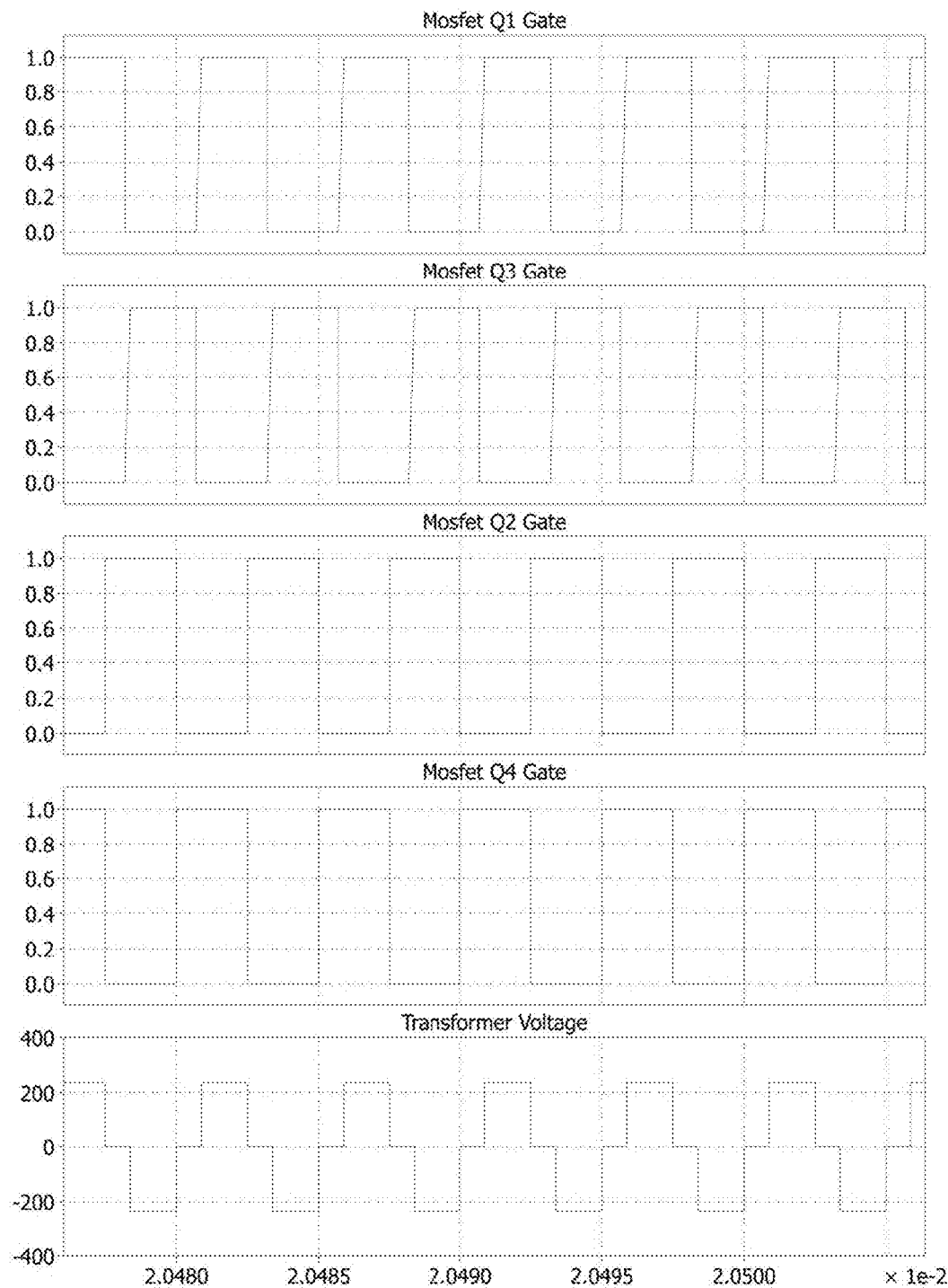
FIG. 16 illustrates waveforms of a wave shaper circuit according to an embodiment of the present disclosure.

Referring to FIG. 16, the present wave shaper circuit includes a phase shift full bridge circuit consisting of 4 power MOSFETs coupled to a transformer. The MOSFETS are switched alternatively (upper leg on, lower leg off and vice versa) and the waveforms of the individual legs are phase shifted. The relative phase shift in turning on/off the MOSFETS generates a digital sine wave at the input of the transformer. A series of such digital sine wave generates a half-wave voltage waveform of 120 Hz/100 Hz (for 60 Hz/50 Hz line frequency) across the inductor at the output of the secondary side of the transformer. The current waveform across the output is also a half wave rectified sine wave of corresponding amplitude. For a 60 Hz line frequency about 1666 samples of digital sine wave (waveform 5) generate 2 of the half-wave rectified sine waves. Phase shifting the switching of the MOSFETs in the full-bridge legs with varying phase results in the Zero Voltage Switching lowering the conduction losses. At the same PSFB operating in ZVS mode also allows higher frequency switching thereby reducing the switching losses.

In an example, the present invention provides an inverter device. The device includes a slave inverter circuit configured to generate a rectified DC waveform and an active ripple cancellation boost circuit coupled to the slave inverter circuit and being configured coupled to a DC source from a plurality of solar cells and configured to filter an AC current ripple back to the DC source and boost the DC voltage to an intermediary 12-15 voltage range. The device also has a wave shaper circuit coupled to the slave inverter circuit and comprising a phase shift zero voltage switching full bridge circuit and a rectifier energy recovery circuit. The phase shift zero voltage switching full bridge circuit is configured to shape the DC source to a half wave rectified 120V to 240V waveform. The rectifier energy recovery circuit is configured to recovery energy during a switching operation to cause formation of the waveform. The device also includes an analog mixed signal or digital controller module configured to generate a PWM waveform and synchronize the rectified waveform to a grid voltage and configured to manage a plurality of sense circuits coupled to a plurality of solar cells to record a cell group voltage and cell group current.

In a specific embodiment, the inverter device has variations. The inverter device further comprising a master control module configured to a plurality of analog mixed signal or digital controller modules. The master control module is configured to generate a reference signal for each of the analog mixed signal control modules and turn off/on the rectified waveform from each of the inverter devices to a power-line grid. The master controller module comprising a detector device coupled to the power-line grid to measure a grid voltage and a grid frequency at any given time. The master control module is configured to turn on/off each of the inverter devices using information from the grid voltage and/or the grid frequency. The master controller module is configured on a solar module by attachment to a backplane of the solar module. The backplane being is substantially free from a junction box or power aggregator. The inverter device further comprises a plurality of solar cell groups, each of the solar cell groups having a DC input to the DC slave circuit. The master controller is configured to control a un-folder circuit, which comprise an H-bridge circuit with one of an SCR, MOSFET, or an IGBT circuit. The un-folder circuit is controlled with a closed loop control algorithm for delivery of power to a power-line grid by aggregating a plurality of current waveforms generated by a plurality of slave inverter circuits.

In an alternative example, the master controller and the analog mixed signal or digital controllers are configured to communicate to exchange a plurality of reference signals and at least one voltage/current level from of each of the solar cell groups. The master controller generates a reference voltage waveform proportional to a power line grid voltage within a determined desired limit at the power line grid frequency. The master controller generates an instant shutoff signal which when received by the analog mixed signal or digital controller power down a plurality of switching circuits of the slave inverter circuit within 500 milliseconds of an initiation of the generation of the instant shutoff signal. The master controller generates an additional sine-wave modulated onto an output voltage waveform to distort a power-line grid voltage waveform which in a presence of a power line grid is free from any alteration of the power line grid voltage waveform or the additional sine wave modulated onto the output voltage waveform distorts the output voltage waveform in absence of the power line grid to initiate the shut off of the slave inverter circuit.

In an example, the slave inverter circuit controlled by an analog mixed signal or digital controller continuously monitors a power output from a cell group coupled to the slave inverter circuit to maximize the power output by varying a power level and tracking a maximum power point (MPPT) of the cell group. The slave inverter circuit controlled by an analog mixed signal or digital controller maximizes the power output to a varying power level caused by a change in irradiation provided on the cell group. The slave inverter circuit controller by an analog mixed signal or digital controller comprises phase lock loop (PLL) circuit to synchronize a reference voltage sampled by a master circuit to shape an output current and a voltage waveform. The slave circuit comprises a power loss reduction circuit configured to reduce an energy loss in a diode bridge generating the half-wave rectified waveform, the energy loss circuit being provided by a CMOS circuit or SiC circuit.

In an example, the back plane comprises a plurality of DC inputs from the solar cell groups fed into a printed circuit board of the back plane at a plurality of pre-defined points to couple the plurality of pre-defined points with the plurality of slave inverter circuits and an auxiliary power supply. The auxiliary power supply provides power to operate the plurality of slave inverter circuits, the master controller module, the un-folder circuit, a communication controller and other associated circuits. The auxiliary power supply adapted to be triggered at a plurality of voltage levels associated with a design of the group of cells. The wave shaper circuit comprising a Phase shift full bridge zero voltage switch (ZVS) circuit and a diode loss recovery circuit.

In an example, the present invention also includes related methods to carryout the functionality of the circuits and systems described herein. In an example, the present invention provides a method for operating an inverter device. The method includes generating a rectified DC waveform using a slave inverter circuit, filtering an AC current ripple back to the DC source, boosting the rectified DC waveform to an intermediary 12-15 voltage range, shaping the rectified DC waveform to a half wave rectified 120V to 240V waveform, recovering energy using the rectifier energy recovery circuit during a switching operation, generating a PWM waveform using either an analog mixed signal module or digital controller module, synchronizing the rectified DC waveform to a grid voltage, and managing a plurality of sense circuits coupled to the plurality of solar cells to record a cell group voltage and a cell group current. In an example, the present method further includes generating a reference signal for each of the analog mixed signal control modules to turn off/on the rectified DC waveform from each of the inverter devices to a power-line grid.

It should be understood that the description recited above is an example of the disclosure and that modifications and changes to the examples may be undertaken which are within the scope of the claimed disclosure. Therefore, the scope of the appended claims should be accorded the broadest interpretation so as to encompass all such modifications and similar arrangements, including a full scope of equivalents.

The invention claimed is:

1. A distributed power converter for a solar module comprising:
   a plurality of slave circuits, each of the slave circuits comprising:
      an input comprising a DC input from a solar cell group;
      a preliminary boost circuit coupled to the input, the preliminary boost circuit configured to boost an input voltage from the input from the solar cell group to an intermediary voltage;
      a DC boost circuit coupled to the preliminary boost circuit and configured to boost the intermediary voltage to an AC RMS peak voltage;
      a rectifier circuit coupled to the DC boost circuit and configured to wave shape the DC output to a half wave rectified DC waveform;
      a rectifier energy recovery circuit configured to reduce a diode recovery loss in the rectifier circuit, the rectifier energy recovery circuit coupled to the rectifier circuit at a first node and a second node, the rectifier energy recovery circuit including a first diode, a second diode, a capacitor, and an inductor; and
      an output coupled to the rectifier energy recovery circuit and a DC bus structure, the output comprising a third node and a fourth node, wherein the inductor has a first end connected to the first node and a second end connected to the third node, the first diode is connected to the capacitor at a fifth node, the first diode and the capacitor are connected between the first node and the second node, and the second diode has a first end
   connected to the second end of the inductor and a second end connected to the fifth node;
      a master circuit, the master circuit being coupled to each of the slave circuits via the DC bus structure, the master circuit being configured to generate a timing signal to synchronize each of the slave circuits to generate a synchronized half wave rectified DC waveform to output a resulting half wave rectified DC waveform having an amplitude characterized by a combination of each of the amplitudes from each of the slave circuits.

2. The device of claim 1 wherein each input comprises a first terminal and a second terminal.

3. The device of claim 1 wherein each of the preliminary boost circuits comprises an inductive storage coupled to a capacitive storage coupled within a boost circuit.

4. The device of claim 1 wherein each of the DC boost circuit comprises a phase shift full bridge boost circuit or an advanced boost circuit achieving Zero-Voltage-Switching (ZVS) or Zero-Current-Switching (ZCS) or both ZVS and ZCS.

5. The device of claim 1 wherein each of the rectifier circuits comprises a four diode bridge circuit.

6. The device of claim 1 wherein the input comprises a voltage of at least four (4) volts.

7. The device of claim 1 wherein the intermediary voltage ranges from about 15 volts to 20 volts.

8. The device of claim 1 wherein the half wave rectified DC waveform has a voltage ranging from about 160 volts to 350 volts.

9. The device of claim 1 wherein each of the half wave rectified DC waveforms is characterized by a substantially similar voltage to result in aggregated current waveform, the aggregated current waveform being substantially equal to a number of currents resulting from each of the half wave rectified DC waveforms, wherein the number is equal to a number of slave circuits in the plurality of slave circuits.

10. The device of claim 1 wherein each slave circuit is directly coupled to a solar cell group configured in a serial manner, such that output power is optimized from the solar cell group.

11. The device of claim 10 wherein each of the slave circuits provides a galvanic isolation between a DC source derived from each solar cell group and a combined AC supply which is either from a grid source or a reference AC signal generated by another device.

12. The device of claim 11 wherein each of the slave circuits is suspended with a common signal and prevented from performing an DC to AC inversion to enhance safety when connected to the grid source.

13. The device of claim 1 wherein the distributed power converter is provided on a backside of a substrate of the solar module and is substantially free from a junction box or power aggregator.

14. The device of claim 1 wherein the master circuit is configured to unfold a voltage and a current waveform on the DC bus structure.

15. A method of using a distributed power converter for a solar module comprising:
   generating a DC output from a solar cell group of a plurality of solar cell groups provided in a module;
   receiving the DC output at an input of a preliminary boost circuit coupled to the input;
   boosting, using the preliminary boost circuit, an input voltage from the input from the solar cell group to an intermediary voltage, the preliminary boost circuit coupled to a DC boost circuit;
   boosting, using the DC boost circuit, the intermediary voltage to an AC RMS peak voltage, the DC boost circuit being coupled to a rectifier circuit;
   wave-shaping a DC output to a half wave rectified DC waveform using a rectifier circuit;
   reducing a diode recovery loss in the rectifier circuit using a rectifier energy recovery circuit, the rectifier energy recovery circuit coupled to the rectifier circuit including a first diode, a second diode, a capacitor, and an inductor;
   generating a timing signal from a master circuit to synchronize the half wave rectified DC waveform and to generate the synchronized half wave rectified DC waveform; and
   combining the synchronized half wave rectified DC waveform with a plurality of other synchronized half wave rectified DC waveforms to output a resulting half wave rectified DC waveform having an amplitude characterized by a combination of each amplitude from each of synchronized half wave rectified DC waveforms.

* * * * *